United States Patent
Oksman et al.

(10) Patent No.: US 10,141,977 B2
(45) Date of Patent: Nov. 27, 2018

(54) SPECIAL OPERATIONS CHANNEL IN VECTORED SYSTEMS

(71) Applicant: Lantiq Deutschland GmbH, Neubiberg (DE)

(72) Inventors: Vladimir Oksman, Morganville, NJ (US); Rainer Strobel, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 147 days.

(21) Appl. No.: 14/890,166

(22) PCT Filed: May 13, 2014

(86) PCT No.: PCT/EP2014/059702
§ 371 (c)(1),
(2) Date: Nov. 10, 2015

(87) PCT Pub. No.: WO2014/184165
PCT Pub. Date: Nov. 20, 2014

(65) Prior Publication Data
US 2016/0119107 A1    Apr. 28, 2016

Related U.S. Application Data

(60) Provisional application No. 61/822,474, filed on May 13, 2013.

(51) Int. Cl.
*H04B 3/32* (2006.01)
*H04M 11/06* (2006.01)
*H04L 5/00* (2006.01)
*H04M 3/00* (2006.01)

(52) U.S. Cl.
CPC ............. *H04B 3/32* (2013.01); *H04L 5/0092* (2013.01); *H04M 3/007* (2013.01); *H04M 11/062* (2013.01)

(58) Field of Classification Search
CPC ....................................................... H04B 3/32
See application file for complete search history.

(56) References Cited

U.S. PATENT DOCUMENTS

| | | | | |
|---|---|---|---|---|
| 2009/0245340 | A1* | 10/2009 | Sorbara | H04L 1/0045 375/227 |
| 2009/0270038 | A1 | 10/2009 | Clausen | |
| 2009/0285326 | A1* | 11/2009 | Lablans | H04J 13/105 375/286 |
| 2010/0195817 | A1* | 8/2010 | Cendrillon | H04B 3/32 379/406.06 |
| 2012/0163491 | A1* | 6/2012 | Clausen | H04B 3/32 375/285 |

(Continued)

FOREIGN PATENT DOCUMENTS

WO    WO2011009584 A1 *  1/2011

OTHER PUBLICATIONS

Recommendation ITU-T G.993.5, "Self-FEXT cancellation (vectoring) for use with VDSL2 transceivers", Apr. 2010.*

(Continued)

*Primary Examiner* — Jason E Mattis
(74) *Attorney, Agent, or Firm* — Eschweiler & Potashnik, LLC

(57) ABSTRACT

Methods and devices are provided wherein a signal sent on a special operation channel is modified by an identification of a line.

20 Claims, 2 Drawing Sheets

(56) References Cited

U.S. PATENT DOCUMENTS

2012/0275591 A1\* 11/2012 Mahadevan ............ H04B 3/32
378/417

OTHER PUBLICATIONS

Vladimir Oksman Lantiq: "G.fast: The issue with SOC scrambling; TD2013-05-Q4-061", ITU-T Draft; Study Period 2013-2016, International Telecommunication Union, Geneva; CH, vol. 4/15, May 7, 2013 (May 7, 2013), pp. 1-4, XP017580461, [retrieved on May 7, 2013] abstract p. 2-4.
Vladimir Oksman Lantiq: "G.fast: Proposed text update of Channel Discovery Phase section; TD2013-05-Q4-027", ITU-T Draft; Study Period 2013-2016, International Telecommunication Union, Geneva; CH, vol. 4/15, May 7, 2013 (May 7, 2013), pp. 1-8, XP017580450, [retrieved on May 7, 2013] pp. 36-37.
International Search Report of PCT/EP2014/059702.

\* cited by examiner

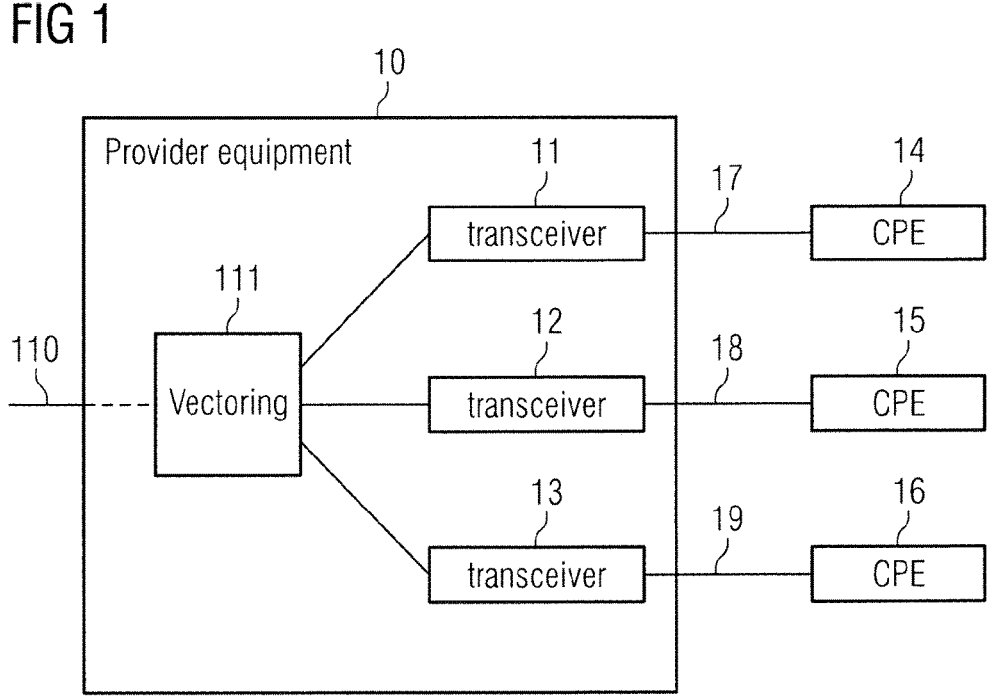

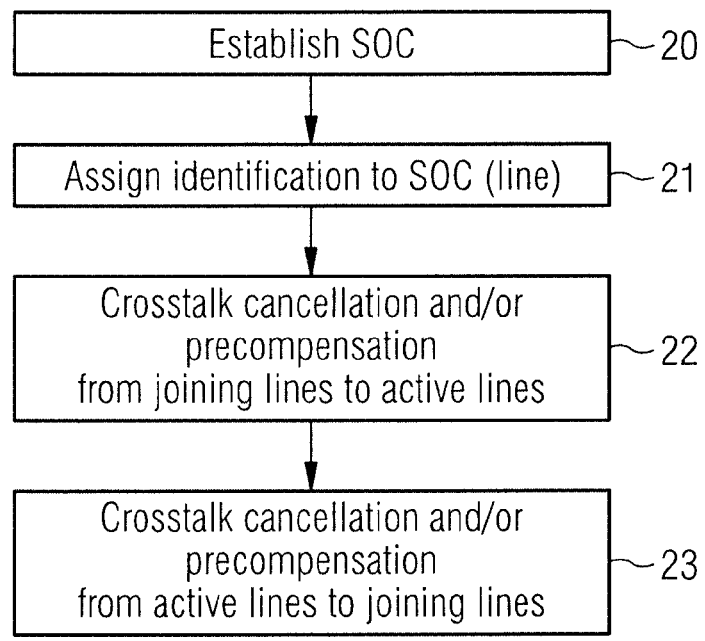
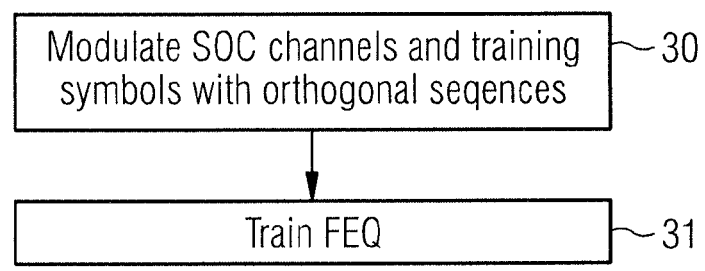

SPECIAL OPERATIONS CHANNEL IN VECTORED SYSTEMS

CROSS-REFERENCE TO RELATED APPLICATION

This application is a national stage entry of PCT/EP2014/059702 having an international application date of May 13, 2014, which application claims priority of U.S. Application Ser. No. 61/822,474 filed May 13, 2013, entitled, "Special operations channel that improves training of vectored lines and protects against ghost initialization". The entire disclosure of the prior application is considered part of the disclosure of this application and is hereby incorporated by reference.

The present application relates to a special operation channel which may for example be used for vectored systems.

BACKGROUND

Digital Subscriber Line (DSL) technology, including e.g. ADSL, ADSL2, (S)HDSL, VDSL, VDSL2 up to the upcoming G.fast, during all its history, attempted to increase the bit rate in the aim to deliver more broadband services to the customer. Unfortunately, copper loops deployed from a Central Office (CO) to customer premises (CPE) are rather long and do not allow transmission of data with bit rates more than few Mb/s. Therefore, to increase the customer available bit rates, modern access networks use street cabinets, MDU-cabinets, and similar arrangements, also referred to as distribution points (DP): the cabinet or other DP is connected to the CO by a high-speed fiber communication line, e.g., gigabit passive optical network (GPON) and installed close to the customer premises. From these cabinets, high-speed DSL systems, such as Very-High-Bit-Rate DSL (VDSL), provide connection to the CPE. The currently deployed VDSL systems (ITU-T Recommendation G.993.2) have range of about 1 km, providing bit rates in the range of tens of Mb/s. To increase the bit rate of VDSL systems deployed from the cabinet, the recent ITU-T Recommendation G.993.5 defined vectored transmission that allows increasing upstream and downstream bit rates up to 100 Mb/s. Vectoring will also be used in upcoming G.fast.

One important component or stage of DSL system is initialization (or training). During the initialization, lines that join to the vectored group provide the ability for existing active lines to accommodate crosstalk from new lines, provide the ability for joining lines to accommodate crosstalk from active lines, and finally provides joining lines with proper PSD and channel setting and bit loading.

This application addresses for example issues in initialization of vectored lines that use high and very high frequencies.

One of the elements conventionally used to perform initialization is a special operations channel (SOC) that is established between a DP modem and a CPE modem during initialization to communicate messages between modems that are necessary to support the initialization procedure and convey special training signal and sequences to train the transceivers. The SOC is usually built in a very robust way and operates during initialization only. Examples of SOC that are used in current DSLs are described for example in ITU-T Recommendations G.993.2, G.993.5.

One serious issue with vectored lines is high crosstalk, especially when very high frequencies (such as 100 MHz and higher) are used. During initialization and training, when FEXT (far-end crosstalk) between lines is not cancelled, signals transmitted over lines are "visible" in all other lines. One issue with that is the initialization and training signals and messages transmitted over one line are received in another line(s), thus producing inaccurate or even false (or ghost) training, which may increase the training time or even harm the active lines operating in the vectored group and serving customers. In emerging new generation of DSL technology, such as G.fast, FEXT from adjacent line may be stronger than the direct signal which may ghost initialization and cross-line training not only possible, but even probable. One of typical issues is that neighboring SOC signals disturb the direct channel estimation process, especially training of FEQ and some other procedures that require operation in the presence of high crosstalk.

BRIEF DESCRIPTION OF THE DRAWINGS

FIG. 1 is a block diagram illustrating a communication system according to an embodiment.

FIG. 2 is a flowchart illustrating a method according to an embodiment.

FIG. 3 illustrates a method according to a further embodiment.

DETAILED DESCRIPTION

Embodiments will be described in the following in detail with reference to the attached drawings. It should be noted that these embodiments serve as illustrative examples only and are not to be construed as limiting. For example, while embodiments may be described having numerous details, features or elements, in other embodiments some of these details, features or elements may be omitted and/or may be replaced by alternative features or elements. In other embodiments, additionally or alternatively further features, details or elements apart from the ones explicitly described may be provided.

Communication connections discussed in the following may be direct connections or indirect connections, i.e. connections with or without additional intervening elements, as long as the general function of the connection, for example to transmit a certain kind of signal, is preserved. Connections may be wireless connections or wire-based connections unless noted otherwise.

Some embodiments propose a transmission method for messages and special signals used during the training/initialization which avoid false initialization and increases accuracy of training.

Some embodiments comprise a method of communication over a SOC which gives any CPE an opportunity to identify its own SOC signal from other SOC signals transmitted over the lines e.g. in the same binder and penetrating as a crosstalk (FEXT, in particular). In an embodiment, the method is based on using orthogonal sequences and low-correlation scrambling polynomials, which may be identified by the receiver. In some embodiments, also techniques are provided that allow receivers to perform more accurate measurements of SNR and other parameters, including FEQ coefficients, in presence of very high crosstalk from other lines.

Turning now to the figures, in FIG. 1a communication system according to an embodiment is shown. The system of FIG. 1 comprises a provider equipment 10 communicating with a plurality of CPE units 14-16. While three CPE units 14-16 are shown in FIG. 1, this serves merely as an example, and any number of CPE units may be provided. Provider equipment 10 may be central office equipment, equipment in a distribution point (DP), or any other equipment used on a provider side. In case provider equipment 10 is part of a distribution point, it may for example receive and send data from and to a network via a fiber optic connection 110. In other embodiments, other kinds of connections may be used.

In the embodiment of FIG. 1, provider equipment 10 comprises a plurality of transceivers 11-13 to communicate with CPE units 14-16 via respective communication connections 17-19. Communication connections 17-19 may for example be copper lines, e.g. twisted pairs of copper lines. Communication via communication connections 17-19 may be a communication based on a multicarrier modulation like discrete multitone modulation (DMT) and/or orthogonal frequency division multiplexing (OFDM), for example an xDSL communication like ADSL, VDSL, VDSL2, G.Fast etc., i.e. a communication where data is modulated on a plurality of carriers, also referred to as tones. In some embodiments, the communication system may use vectoring, as indicated by a block 111 in FIG. 1. Vectoring comprises joint processing of signals to be sent and/or received to reduce crosstalk.

A communication direction from provider equipment 10 to CPE units 14-16 will also be referred to as downstream direction, and a communication direction from CPE units 14-16 will be also referred to as upstream direction. Vectoring in the downstream direction is also referred to as crosstalk precompensation, whereas vectoring in the upstream direction is also referred to as crosstalk cancellation or equalization.

Provider equipment 10 and/or CPE units 14-16 may include further communication circuits (not shown) conventionally employed in communication systems, for example circuitry for modulating, bit loading, Fourier transformation etc.

In some embodiments, communication via communication connections 17-19 is a frame-based communication. A plurality of frames may form a superframe.

In some embodiments, on communication connections 17-19, which in some embodiments may comprise copper lines, a special operation channel (SOC) may be established. Each SOC may be assigned an identification, for example an identification polynomial, such that even in the case of strong crosstalk a receiver (either provider equipment 10 or CPE units 14-16 in the example of FIG. 1) may recognize its associated special operation channel based on the identification and disregard messages from special operation channels which it may receive via crosstalk from other lines. Other techniques may also be used.

Some embodiments relate to a system using e.g. either frequency division duplexing, such as VDSL2, or synchronized time division duplexing (STDD), as used in modern DP vectored transceivers, such as G.fast. In case of STDD, each line has assigned time allocation for upstream and downstream transmission time slots (TTS for US and DS) separated by a guard time. Further, downstream TTS of all vectored lines are aligned and upstream TTS of all lines are aligned. There is a guard time set between upstream and downstream transmissions.

In FIGS. 2 and 3, flowcharts illustrating methods according to embodiments are illustrated. While the methods of FIGS. 2 and 3 are described as a series of acts or events, the order in which such acts or events are described is not to be construed as limiting. Instead, in other embodiments the acts or events may be performed in a different order, and/or some of the acts or events may be performed in parallel, for example by different devices in a system or by different parts of a circuit.

During the initialization of a vectored group, at 20 in FIG. 2 the method of FIG. 2 comprises establishing a special operations channel (SOC) between the transceivers of each initializing line as they join to the vectored group. A vectored group, in this respect, refers to all lines or communication connections which take part in the vectoring, i.e. for which crosstalk is reduced. When in a system for example a new line becomes active, this line often needs to join the vectored group and is referred to as joining line. Also at startup for a system, building of the vectored group may be seen as joining the lines initially being part of the vectored group. Lines already in the vectored group when additional lines are to be joined, i.e. joining lines are present, may be referred to as active lines. The initialization procedure may include several stages. The initial stages of initialization provide crosstalk cancellation and/or precompensation from joining lines into active lines (to avoid distortion of services running over active lines), e.g. 22 in FIG. 2. However, crosstalk from active lines into joining lines is cancelled or precompensated at later stages, e.g. 23 in FIG. 2, because performing of crosstalk cancellation requires an intensive exchange of relevant parameters (e.g., error samples) between the transceivers connected to each of joining lines prior to the cancellation or precompensation can be performed (precoder or cancellation coefficients can be computed). During this exchange and at earlier stages of initialization the crosstalk between joining lines is not reduced by cancellation or precompensation and thus this crosstalk impacts the exchange of data and training signals between the peer transceivers, which are mainly, but not necessarily fully, communicated over SOC.

In conventional systems, two problems may be observed:
control messages communicated over SOC in one joining line are received by other joining line, resulting in wrong configuration;
training signals transmitted over one joining line interfere with or can even suppress training signals in other joining line, thus resulting in a wrong FEQ training, causing wrong measurements or incomplete training.

These problems may be especially harmful for systems like G.fast which operate over very high frequencies (up to 200 MHz) at which the power of FEXT often exceeds the power of the received signal.

To avoid the impact of harmful crosstalk, embodiments comprise assigning to each line of the DP or other provider equipment an identification like an identification polynomial (IDP), e.g. at 21 in FIG. 2. As for example on each line a SOC may be established, assigning an identification polynomial or other identification to a line may also be seen as assigning the identification to the SOC. Further, the SOC signal transmitted over the line, prior to being modulated by the control or management data messages, in embodiments is multiplied by the IDP or merged with the IDP by some other useful and relevant means. The properties of the IDP are assigned in the way that the receiver of a particular line can distinguish its own SOC signal from the neighboring signals. This in embodiments can resolve the above-described issues in general. For example, in embodiments identification polynomials of different lines may be orthogonal to each other, such that in embodiments an unambiguous identification becomes possible.

In one embodiment, the SOC is implemented by using multicarrier modulation, and every sub-carrier is modulated by one or more bits of the transmitted message, or modulated by a particular training sequence. QPSK modulation and repetition over multiple carriers may be used in embodiments to improve robustness. In such an embodiment, an IDP is used to rotate the constellations of every subcarrier. The length of the polynomial is selected to cover a sufficiently long sequence of symbols, such as frame or superframe, in the aim to achieve time diversity. One of the implementations may use the same generating polynomial, while the seed of the polynomial represents the ID of the respective line. With seeds selected accordingly, correlation between SOC signals in different lines can be minimized. Other implementation can use different polynomials with carefully selected properties to provide low correlation between different SOC channels or orthogonal polynomials, such as Walsh-Hadamard sequences.

In some embodiments, in a downstream direction, the CPE trains a frequency domain equalizer (FEQ) of the CPE based on a known training signal received from provider equipment. In conventional approaches, the training signal is pre-defined, but in systems using crosstalk cancellation such training is usually not possible.

In practice, multiple lines are often trained simultaneously and therefore they transmit the training signal at the same time. In conventional approaches, channels with strong crosstalk, this may result in a wrong training of the frequency domain equalizer, because the equalizer trains on the sum of direct channel and crosstalk from the other joining lines, instead of the direct channel only. The issue comes up if the crosstalk signals and direct signal are the same or strongly correlated.

In one embodiment, the frequency domain equalizer is implemented as an adaptive filter which is continuously updated during an initialization using SOC channel data. During the training of multiple joining lines, all the trained lines transmit the same signal (called the IDLE signal in some conventional approaches) over long periods of time. This causes a problem that the frequency domain equalizer can't distinguish between signal from the direct channel and the crosstalk channels from other lines.

To distinguish between signals from the direct channel and crosstalk from other joining lines, it is required that the joining lines either send uncorrelated signals or orthogonal signals over time.

In one embodiment illustrated in FIG. 3, at 30 the SOC channels as well as the training symbols are modulated with a bipolar orthogonal sequence, such as Walsh-Hadamard sequence, or a three-state sequence, with elements +1, 0, and −1, which is exchanged between CO and CPE in advance. A different sequence is assigned to each joining line such that training signals are mutually orthogonal. In each time instance, the transmit data in different joining lines is modulated with a different element of the orthogonal sequence. The units of time may e.g. be DMT symbols or group of symbols.

In some embodiments, the sequences may be different for different subcarriers, but it is required that they are mutually orthogonal to the sequence of other lines carried by the same subcarrier. An implementation can assign several groups of subcarriers, same in all joining lines. For each group of same line same or different sequences can be applied, while sequences applied to the same group of different lines shall be orthogonal. The specific bit of a sequence may be applied during one symbol or during a group of consecutive symbols, or to group of symbols selected by some other pre-defined rules. Grouping of sub-carriers and specific sequences used for each line are assigned at earlier stages of initialization, or by manufacturer, or by installer.

In another embodiment, at 30 the SOC channels as well as the training symbols are modulated with a pseudorandom binary sequence which is selected differently for each line. A different identification polynomial is assigned to each line. Each subcarrier on a line is modulated with a different element of the pseudorandom sequence and the sequence is continued over the relevant subcarriers of the following symbols over time so that the joining lines are uncorrelated over time and frequency. In some embodiments the modulation by pseudorandom sequence re-starts at the beginning of the superframe, thus limiting the time range. This time range is selected to be sufficient for FEQ convergence is the considered worst case conditions.

In another embodiment, at 30 all constellation points of every SOC symbols are rotated by the same scrambling polynomial, which is reset at the start of the symbol (as in the prior art), but further all constellation points are multiplied by a bit or an orthogonal (pseudo-orthogonal) sequence, which can be −1, +1, or 0. Every joining line uses its own sequence. In some implementations, more than one sequence per line is defined, and same group of tones in every line is associated with a particular set of orthogonal sequences. Sets of orthogonal sequences and groups of tones are assigned at earlier stages of initialization, or by manufacturer, or by installer.

In another embodiment, at 30 all constellation points of every SOC symbols are rotated by the same scrambling polynomial (as in the prior art), but the scrambling polynomial is not reset at every symbol, but at every superframe and it starts from a specific seed that is selected to provide less correlation between different lines.

In some embodiments, at 31 the thus modulated SOC channels and training symbols are used for frequency equalizer training. Through the modulation of 30, receivers, for example a CPE equipment, may recognize direct channel training sequences and distinguish them from training sequences received via crosstalk from other lines in some embodiments.

Some embodiments introduce special generating polynomials and a protocol associated with transmission and reception of SOC signals applying those. Some embodiments of methods may be incorporated as a part of the new G.fast standard. In some cases, devices supporting hidden nodes use such a protocol to be compliant with the standard.

In some embodiments, a method or apparatus may be provided that assigns to each line of a DP modem an identification polynomial (IDP) and transmits a SOC signal over a line which prior to being modulated by control or management data messages is multiplied by the identification polynomial or merged with the identification polynomial.

The above-described embodiments serve as examples only and are not to be construed as limiting. The above-mentioned methods may be implemented in devices using hardware, software, firmware or combinations thereof, for example in the devices and system illustrated in FIG. 1. For example, to implement methods disclosed herein firmware of conventional devices may be updated to be able to use techniques disclosed herein.

The invention claimed is:
1. A method, comprising:
assigning an identification to each line associated with a provider equipment; and
transmitting a special operation channel (SOC) signal over at least one of the lines, wherein SOC symbols of the SOC signal transmitted over each of the at least one of the lines are modified by the identification of that line.

2. The method of claim 1, wherein the identification comprises an identification polynomial.

3. The method of claim 2, wherein the modifying comprises at least one of multiplying the SOC signal with the identification polynomial or merging the SOC signal with the identification polynomial.

4. The method of claim 1, wherein the modifying is performed prior to modulating the SOC signal by a control or management data message.

5. The method of claim 1, wherein the identification is based on at least one of a Walsh-Hadamard sequence or a three-state sequence.

6. The method of claim 1, further comprising, at a receiver, distinguishing a SOC signal received via a direct channel from an SOC signal received via crosstalk based on the identification.

7. The method of claim 6, further comprising performing at least one of a vector training or a frequency equalizer training based on the SOC signal received via the direct channel.

8. The method of claim 1, further comprising modulating training symbols with orthogonal sequences, and performing a training based on the training symbols.

9. A device, comprising a transmitter,
the transmitter being adapted to transmit a special operation channel (SOC) signal over at least one of a plurality of lines, wherein SOC symbols of the SOC signal are modified by the identification of the respective line, an identification being assigned to each line associated with a provider equipment.

10. The device of claim 9, wherein the identification is an identification polynomial.

11. The device of claim 9, wherein for the modifying the transmitter is adapted to at least one of multiplying the SOC signal with the identification polynomial or merging the SOC signal with the identification polynomial.

12. The device of claim 9, wherein the transmitter is adapted to perform the modifying prior to modulating the SOC signal by a control or management data message.

13. The device of claim 9, wherein the identification is based on at least one of a Walsh-Hadamard sequence or a three-state sequence.

14. The device of claim 9, further being adapted to modulate training symbols with orthogonal sequences.

15. A device, comprising a receiver,
the receiver being adapted to receive a special operation channel (SOC) signal over at least one of the lines, wherein SOC symbols of the SOC signal are modified by a respective identification, an identification being assigned to each line associated with a provider equipment,
the device being adapted to distinguish a SOC signal received via a direct channel from an SOC signal received via crosstalk based on the identification.

16. The device of claim 15, wherein the identification is an identification polynomial.

17. The device of claim 15, wherein the identification is based on a Walsh-Hadamard sequence.

18. The device of claim 15, wherein the identification is based on a three-state sequence.

19. The device of claim 15, further being adapted to perform a vector training based on the SOC signal received via the direct channel.

20. The device of claim 15, further being adapted to perform a frequency equalizer training based on the SOC signal received via the direct channel.

* * * * *